United States Patent [19]

Schaefer et al.

[11] Patent Number: 4,685,591
[45] Date of Patent: Aug. 11, 1987

[54] DISPENSING TUBE PACKAGE

[75] Inventors: Suzanne E. Schaefer; John P. Eckstein, both of Neenah, Wis.

[73] Assignee: American Can Company, Greenwich, Conn.

[21] Appl. No.: 687,526

[22] Filed: Dec. 28, 1984

[51] Int. Cl.⁴ .......................................... B65D 35/08
[52] U.S. Cl. .................................. 222/107; 222/215; 428/35
[58] Field of Search .................... 222/107, 92, 215; 428/35, 36, 516; 220/415, 450, 461; 138/138, 141

[56] References Cited

U.S. PATENT DOCUMENTS

| | | | |
|---|---|---|---|
| 4,226,337 | 10/1980 | Abbott | 222/107 |
| 4,257,536 | 3/1981 | Hilmar | 428/36 X |
| 4,284,672 | 8/1981 | Stillman | 428/35 |
| 4,330,351 | 5/1982 | LoMaglio | 428/36 X |
| 4,418,841 | 12/1983 | Eckstein | 428/36 X |

FOREIGN PATENT DOCUMENTS

1116910  6/1968  United Kingdom ............... 222/215

*Primary Examiner*—Joseph J. Rolla
*Assistant Examiner*—David H. Bollinger
*Attorney, Agent, or Firm*—Thomas D. Wilhelm; Paul R. Audet

[57] ABSTRACT

The invention is in an improved packaging tube and the packages, containing product, made therefrom. The packaging is suitable for holding products containing substantial fractions of cyanoacrylate-type components. The invention depends on the use of special multiple layer sheet material for the tube sidewall and a covering strip over the inside surface of the tube longtitudinal sideseam. A layer of high density polyethylene is positioned on the inside surface of the tube, such that it is the surface in direct contact with the product. A primer layer having a Lewis base-type component, such as polyethylene imine, is between the surface of the high density polyethylene layer which is disposed away from the product and subsequent layers which may be susceptible to interaction with the product. Preferred embodiments of the package use sheet materials having additional layers to provide barrier, heat sealability, and abuse resistance properties, and the necessary adhesive materials to hold the various layers of the structure together with good adhesion. Additional layers are contemplated. The covering strip is high density polyethylene, and it covers and protects the edge of the sheet material on the inside of the package at the tube longitudinal sideseam.

60 Claims, 15 Drawing Figures

PRIOR ART

DISPENSING TUBE PACKAGE

BACKGROUND OF THE INVENTION

Products containing cyanoacrylate are quite active chemically. Because of the reactive nature of cyanoacrylates, it has been difficult to find packaging means and materials with which the cyanoacrylate product does not interact in a way which is detrimental to the cyanoacrylate in the package and to holding it in the package.

Traditionally, cyanoacrylate adhesives have been packaged in plastic bottles and metal tubes. The plastic containers do not provide adequate vapor barrier, such that the shelf life of products packaged in conventional plastic containers is undesirably short. Metal tubes also have some undesirable characteristics. They are relatively inflexible, such that they can be flexed only a few times as in repeated dispensing before cracks develop in the tube sidewall. Overall, though, shelf life of cyanoacrylate products is better in metal tubes than in plastic, at least until the tube is initially opened. Nevertheless, the shelf life, even in metal tubes, is less than desired. Clearly, cyanoacrylates are readily identified as being difficult to hold in a package over a desired shelf life period.

Products have been packaged in tube-type containers of generally three types. The first type is a metal tube. Such tubes provide excellent barrier properties, but have undesirable functional properties as discussed above. The second type is a plastic tube made from either single or multiple layers of plastics. While plastic tubes may be excellent for many products, no plastic packaging materials are known which are excellent for holding cyanoacrylate-type products. The third type is a tube made from previously formed multiple layer sheet materials containing a layer of metal foil and a plurality of layers of plastic materials generally referred to hereinafter as laminated tubes.

The third type of tube container has been used conventionally for holding hygienic-type products such as toothpaste. Toothpaste is chemically quite active, and is generally considered difficult to hold in a package.

Attempts to package cyanoacrylate adhesives in the third type of tube containers were not successful with any of the conventionally known sheet materials used to make the laminated tubes. After being packaged in conventional tubes of the third type, the cyanoacrylate adhesive migrated through the polymer layers to the foil layer. The tube delaminated between the foil layer and the adjacent polymer layer. The delaminated tube was not satisfactory for the package.

Cyanoacrylate also tends to cause swelling of polymers. In trials with some experimental multiple layer tubes, polymer layers disappeared as distinct layers, presumably having been either dissolved into the cyanoacrylate or otherwise absorbed into it.

It is an object of this invention to provide a dispensing tube package which is capable of holding cyanoacrylate-type product.

It is another object of the invention to provide a dispensing tube, having a lap sideseam, which is capable of holding cyanoacrylate-type product.

It is still another object to provide a dispensing tube which is capable of holding cyanoacrylate-type product and has excellent barrier to passage of matter through the packaging material.

It is yet another object to provide a closed and sealed tube package having in it a cyanoacrylate-type product.

Another object is to provide a closed and sealed tube package, having a lap sideseam, and containing, in the closed and sealed tube, a cyanoacrylate-type product.

SUMMARY OF THE INVENTION

These and other objectives are achieved in a tube made from a multiple layer sheet material and a covering polymeric strip. The sheet material has a first layer of high density polyethylene (HDPE). A second layer may be a polymer or an adhesive. A third primer layer of preferably polyethylene imine (PEI) is between the first and second layers. The sheet material is formed into a tube having a lap seam extending along the length of the tube. The first layer is positioned toward the inside of the tube.

All the layers of the sheet material are firmly adhered to each other.

The tube has an inner surface facing the interior of the tube and an outer surface on the exterior of the tube. The polymeric strip covers the lap seam on the interior surface of the tube. The strip comprises polyethylene having a resin density of at least 0.950.

Regarding the compositions of the layers and the covering strip, each has preferred features which, while not critical to the invention, contribute to its efficiency or optimization. Thus the resin density of the HDPE as determined by ASTM D-2839 is preferably at least 0.950. It, and the covering strip, should also preferably have narrow molecular weight distributions and should be substantially free of amine components. Preferably the crystallinities of the first layer and of the covering strip are relatively high as developed in formation of the film-like layers which are used in making the first layer and the covering strip.

The second layer may be any of a wide variety of functional materials which exhibit the desired properties. Preferred for the second layer is ethylene acrylic acid copolymer (EAA).

The PEI in the third layer is preferably applied as a liquid solution containing a cross-linking type of polyethylene imine.

In preferred embodiments of the tube, the sheet material includes a fourth layer of metal foil so positioned in the sheet material that the second layer is between the third and fourth layers.

In most preferred embodiments, a fifth layer adheres a sixth layer to the other surface of the fourth layer of metal foil. Preferred composition for the fifth layer is EAA. Preferred composition for the sixth layer is polyethylene, especially high density polyethylene.

Another aspect of the invention is seen in a package which includes the novel tube herein in the form of a package, and a quantity of product therein, wherein the product contains a substantial fraction of a cyanoacrylate-type component.

Still another aspect of the invention is seen in certain packages of the invention which have had product contained therein for a significant amount of time. In these certain packages, the multiple layer sheet material has been modified by virtue of contact with cyanoacrylate-type components contained therein. In the modified form of the sheet material, the PEI primer layer includes reacted components from the cyanoacrylate-type product. The unmodified form of the sheet material, from which the tube structure was formed, is a precursor of the modified form.

DETAILED DESCRIPTION OF THE ILLUSTRATED EMBODIMENTS

Figure 1:
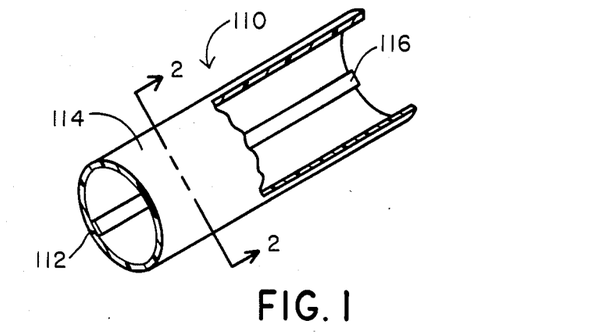
FIG. 1 is a partially cut away pictorial view of a tube structure of the invention.

FIG. 1 shows a tube 110 of the invention, partially cut away, and having a lap seam generally depicted as 112, in the sheet material 114 extending along the length of the tube. A polymeric strip 116 covers the lap seam on its inside surface.

Figure 2:
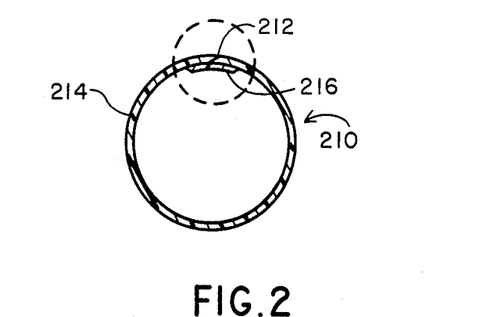
FIG. 2 is a cross-section of the tube of FIG. 1, at 2—2 of FIG. 1.

FIG. 2 shows the same elements of the tube 210, the sheet material 214, the seam 212, and the strip 216, in cross-section. Note that the first digit in each number corresponds to the figure number and that the second and third digits correspond to the element. Common second and third digits correspond to common elements among the figures in the following description also. Suffixes designate significance as pointed out individually. Two-digit numbers as used herein refer commonly to elements as they apply to the pertinent figures.

Figure 3:
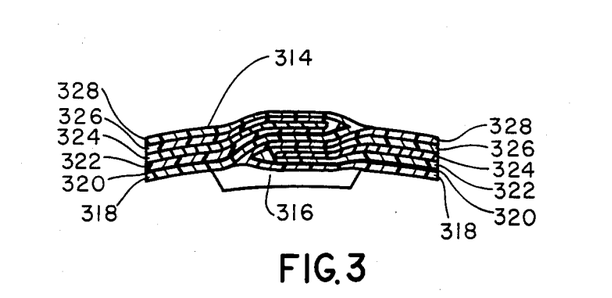
FIG. 3 is a greatly enlarged view of the portion of the tube structure in FIG. 2 which is outlined by the dashed circle; and includes the lap seam.

The greatly enlarged view of FIG. 3 shows the lap seam 12 in detail. The critical portion of the invention resides in the combination of the design of the sheet material 14 and the composition and positioning of covering strip 16.

The sheet material 314, seen in detail in FIGURE 3, is representative of preferred sheet materials of the invention. The layer 318 on the inside surface of the tube is HDPE. Layer 320 is a thin primer layer. Layer 322 is an adhesive which is effective to adhere a foil layer 324 to HDPE layer 318, through primer layer 320. Layer 326 is an adhesive layer which adheres layer 328 to the foil layer 324. Layer 328 is protective of the foil layer and its composition is selected with that protection property as an important criteria. EAA is preferred for layer 326. A polyethylene is preferred for layer 328.

Figure 4:
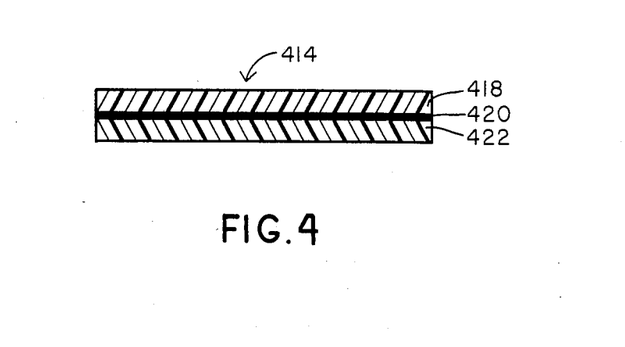
FIG. 4 is a cross-section of a representative three-layer sheet material useful in making the tube packages of this invention.

FIG. 4 shows a simple sheet material 414 useful in making the tube packages of this invention. Sheet material 414 includes two polymeric layers 418 and 422 and a thin primer layer 420 therebetween. Layer 418 is HDPE. The composition of layer 422 is usually polymeric and may be chosen with substantial freedom. Layer 420 is a thin layer of a primer.

Figure 5:
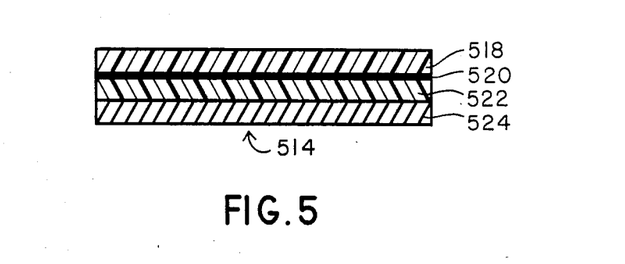
FIG. 5 is a cross-section of a representative four-layer sheet material useful in making the tube packages of this invention.

FIG. 5 shows a sheet material 514, of intermediate complexity, which is useful in making the tube packages of this invention. Layer 518 is HDPE. Layer 520 is a thin primer layer. Layer 522 is an adhesive which is effective to adhere to a foil layer 524. With the introduction of the foil layer 24 into the structure, the composition of adhesive layer 522 is selected such that it provides good adhesion between the foil layer 524 and the HDPE layer 518 through the primer layer 520. EAA is preferred for layer 522.

Figure 6:
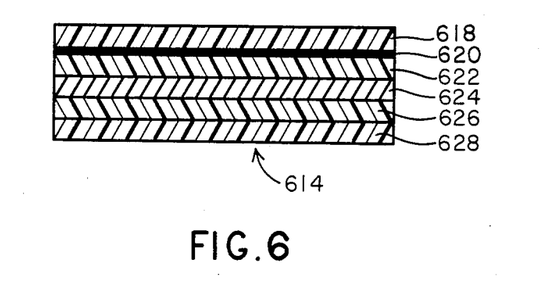
FIG. 6 is a cross-section of a representative six-layer sheet material useful in making the tube packages of this invention.

The sheet material 614 seen in FIG. 6 is representative of preferred sheet materials useful in making the tube packages of this invention, and may be the same as the sheet material shown in the seam structure of FIG. 3. Layer 618 is HDPE. Layer 620 is a thin primer layer of polyethylene imine. Layer 622 is an adhesive which is effective to adhere to a foil layer 624. Layer 626 is an adhesive layer which adheres layer 628 to the foil layer 624. Layer 628 is protective of the foil layer, and its composition is selected with that protection property as an important criteria. EAA is preferred for layers 622 and 626. A polyethylene, and particularly high density polyethylene, is usually preferred for layer 628.

It is seen in FIG. 3 that the seam 12 consists essentially of a lap seam wherein two edge segments of the sheet material 14 are superimposed, in lap fashion, one over the other, and joined together as by a thermal heat sealing process. While such a seam structure is fully adequate for many uses, it does tend to expose the edges of essentially all of the layers of the sheet material, in the segment disposed toward the interior of the package, to the contained product.

Figure 3A:
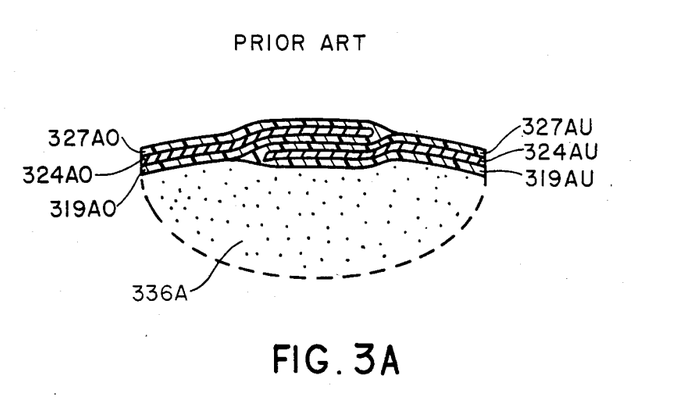
FIG. 3A shows an enlarged view of the lap seam, similar to the view of FIG. 3, but representing, generally, conventional tubes of the prior art.

As stated earlier, cyanoacrylate-type product is highly reactive as a chemical product. It is this strong tendency toward reaction that makes it so difficult to design a package to hold it. It is further important that certain layers of the sheet material used in this invention not be permitted to come into direct contact with the cyanoacrylate-type product. As it has been found that direct contact with cyanoacrylate can be advantageously tolerated by HDPE, it is preferred, and highly functional for the cyanoacrylate-type product to be in direct contact with only HDPE in the finished packages of this invention. In conventional tube structures having a lap seam, the underlying edge in the seam—namely that edge disposed toward the interior of the package—may be exposed in toto, or in part, to the product to be contained therein. This exposure is seen generally, and exaggerated for illustration purposes, in FIG. 3A. FIG. 3A generally represents multiple layer sheet material and its incorporation into a conventional lap seam. For purpose of illustration, the sheet material is shown with three layers. Layer 327 represents the exterior layer of the tube. Layer 319 represents the interior layer of the tube. Layer 324 represents an intermediate layer, or layers, between layer 319 and layer 327. The suffix "AO" designates an overlying layer. The suffix "AU" designates an underlying layer. In forming the lap seam, the underlying and overlying layers 319 and 327 are deformed, and flow, under the influence of the process of combined heat and pressure. To that end, the compositions of layers 319 and 327 are chosen, in part, for their capability to develop strong seals to each other in the process of forming the lap seal. Layers 319 and 327 generally flow around the interior layers 324 at the lap seam, to form generally continuous surfaces on both the inside and outside surfaces of the lap seam. For most products, the flowing of layers 319 and 327 at the time of thermal forming of the lap seam provides adequate covering protection of the other layers, by layers 319AU, 327AU and 319AO joining to form a continuous surface.

Figure 7:
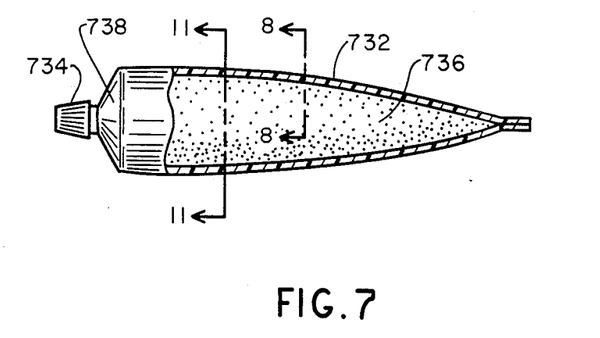
FIG. 7 is a pictorial view of a partially cut-away tube package of this invention, and shows the package having a product therein.
Figure 8:
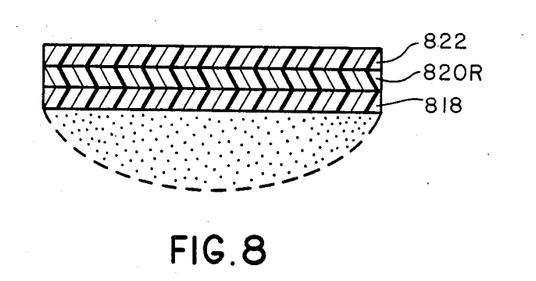
FIG. 8 shows a segment taken at 8—8 of FIG. 7, of a tube sidewall made from a three-layer type sheet material as illustrated in FIG. 4, and including reacted product material.
Figure 9:
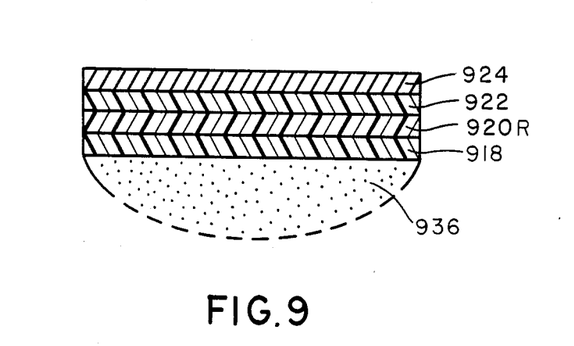
FIG. 9 shows a segment similar to that of FIG. 8, and representing a tube sidewall made from a four-layer type sheet material as illustrated in FIG. 5, and including reacted product material.
Figure 10:
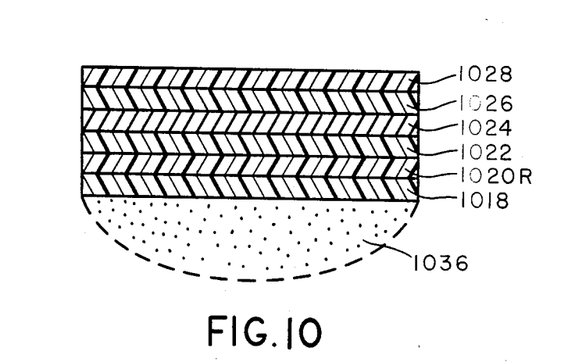
FIG. 10 shows a segment similar to that of FIG. 8 and representing a tube sidewall made from a six-layer type sheet material as illustrated in FIG. 6, and including reacted product material.
Figure 11:
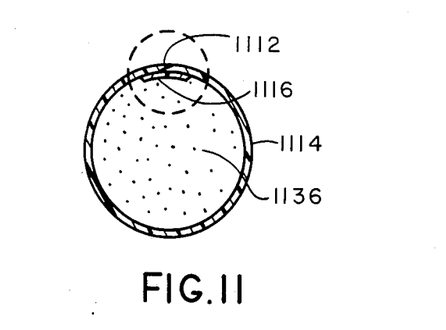
FIG. 11 is a cross-section of the tube of FIG. 7, taken at 11—11 of FIG. 7.

With products having high chemical reactivity, such as cyanoacrylate-type products, the above conventional lap seam in the tube package has been found particularly susceptible to chemical reaction with the product, and subsequent failure of the package. While certain novel sheet structures, such as disclosed herein and illustrated in FIGS. 4, 5, and 6, may be successfully used to make fin-sealed pouches for holding cyanoacrylate-type products, attempts to package cyanoacrylate in tubes such as seen in FIG. 7, and made from those sheet materials, met with failure. After only a short period of storage with product in the closed tube, swelling and delamination occurred at the lap seam in essentially all the tube packages.

It is intended that FIG. 3A represent a family of multiple layer sheet structures, both conventional structures and novel structures such as presented herein in connection with FIGS. 4, 5, and 6; and wherein layers 319A and 327A represent outer layers of the sheet structure. Layer 324A represents the inner layers; and while it is shown as a single layer of metal foil, it should be appreciated that layer 324A is intended to also represent a plurality of layers any of which may be metal, polymeric, or other sheet materials commonly used in tube packaging.

As a result of the inventors' experience with this invention, it is seen that the tubes of the prior art are susceptible to interaction with cyanoacrylate-type product both in the polymer layers and at the edge of the lap seam. By using sheet material having an inner surface layer of HDPE and an adjacent primer layer, interaction with the polymer layers is controlled. However, the tubes made in a conventional method with this sheet material remain susceptible to interaction with cyanoacrylate-type product along the edge of the underlying layer of sheet material in the lap seam. Such tubes are represented by FIG. 3A, and may be of novel or conventional sheet structure.

Returning now to the invention at hand, the lap seam in tubes of the invention has been formed by polymer flow essentially the same as in conventional tubes. It has been found that swelling and delamination of the lap seam, when used with a cyanoacrylate-type product, can be prevented by adhering a strip of HDPE to the interior surface of the tube, thus covering the lap seam. With the HDPE strip thus in place, the edges of susceptible layers which might otherwise be subjected to product contact or other interaction are protected by the HDPE strip, which acts as an effective protector of the susceptible layer or layers.

As is illustrated in FIGS. 3, 4, 5, and 6, the primer layer 20 is thin. It is important that the primer layer be continuous, in order to meet its minimum required functional parameters. Meeting the minimum required functional parameters, however, does not impose any minimum requirements for physical thickness of the primer layer beyond that required for continuity. The typical quantity of a PEI present in the sheet structure is of the order of 0.04 lbs. per 3000 square foot ream. In practice, the presence of layer 20 as a distinct layer is not visually detectable by normal microscopic examination of a cross-section of the sheet structure up to the time it is brought into contact with a cyanoacrylate-type product.

FIG. 7 shows the general nature of representative packages contemplated by the invention. The package includes body 732; including sheet material 14, lap seam 12 and shoulder 738; a closure 734 and product 736.

FIGS. 8, 9, 10, and 12 represent the cross-section as in FIGS. 3, 4, 5, and 6, after the cyanoacrylate product 36 has been in the package for a while. The significant change is that a visible layer 20R has developed at layer 20, which was also the interface of layers 18 and 22 for appearance purposes. For example, in packages evaluated after one week of storage at 120° F., the new layer as at 1220R in FIG. 12 was 0.4 to 0.7 mil thick. Packages evaluated after four weeks of storage at 120° F., had layers 20R which were 0.9 to 1.6 mils thick. Laboratory analyses of the new layers 20R revealed that its primary component is reacted polymer of cyanoacrylate. The development of the visible layer 20R is, of course, highly novel and unexpected, and especially in a role where it appears to impede penetration of cyanoacrylate into the rest of the packaging structure.

In some experimentally made sheet materials which were otherwise the same as the sheet materials 14 of the invention, the primer layer 20 was not continuous, but unintentionally had small discontinuities of pin-hole size. Packages made with these sheet materials were, unexpectedly, not satisfactory. On inspection of the filled and sealed packages after a short storage period of 1 or 2 weeks, spot delaminations were unexpectedly observed. On detailed investigation, discontinuities were identified adjacent each spot delamination. The discontinuities were visible to microscopic inspection, in the reacted layer 20R. No spot delaminations were observed which could not be associated with a discontinuity. Thus the conclusion is reached that the primer layer 20 serves some function of the nature of preventing the migration of the cyanoacrylate product to the surface of the foil 24. It appears that the cyanoacrylate does penetrate and pass through any discontinuity of the primer layer 20, to swell layer 22, and react at the foil layer 24 to cause delamination. It has been concluded that the continuity of the primer layer 20 in the sheet material 14 is critical to operability of the invention, as regards susceptibility of the sheet material to attack through the HDPE layer 18. To that end, it is desirable to treat the surface of the HDPE layer, as necessary such as by corona discharge, before application of the primer, to ensure good wetting of the HDPE layer by the primer when it is applied.

In certain cases, it may be desirable to have additional layers between HDPE layer 18 and the primer layer 20. Such additional layers may be used so long as any interaction they may have with, or as a result of, the product is acceptable, and so long as the primer layer is continuous as described earlier and is separated from any foil layer by at least one intervening layer.

Experimentation has shown that, of the polyethylene imines available, the cross linking types are preferable over the non-crosslinking types. It is hypothesized that the PEI may act as a chemically basic electron donor material, and may interact with the product in polymerization, or other reaction, of the cyanoacrylate product. Once the cyanoacrylate has reacted, the size of the reacted molecule is apparently such that it is no longer as mobile in the laminated sheet structure, and remains in the vicinity of the reaction site to form a part of the growing visible layer 20R. Based on the belief that the PEI acts as a catalytic electron donor, it is believed that other Lewis bases, such as amines and salts of weak acids, should function in a similar manner to impede migration of the product.

Essentially, the presence of the primer layer 20 prevented migration of the cyanoacrylate through the structure past the primer layer. Without the primer, delamination at the foil interface resulted. Likewise, positioning of the primer layer at the foil interface, between layers 22 and 24, resulted in delamination at the foil interface, as well as swelling of the EAA layer.

In general, of the polymers usually associated with good heat sealing capabilities, HDPE is the least affected by cyanoacrylate-type product. Other polymers are caused, by these products, to swell by 50% to over 150%. As in the case of linear low density polyethylene copolymer (LLDPE), some polymeric materials are even absorbed into the product. While HDPE is also swelled somewhat, in the better HDPE's, the swelling is only about 30%, and overall strength of the package is sustained satisfactorily. While most high density polyethylenes are acceptable, some are more preferred. The preferred polymers are characterized by the following properties. Resin density should be at least 0.950. The HDPE preferably has a narrow molecular weight distribution. A high degree of crystallinity in the HDPE layer is desirable, and can be somewhat controlled by the rate of cooling when the HDPE layer is formed by some melt forming process such as extrusion.

The critical elements of the sheet material 14 are the HDPE layer 18 which serves as the sealant layer without being unacceptably affected by the cyanoacrylate product, the primer layer 20, and strip 16. The presence of the primer layer at the disclosed location causes the mobility of the cyanoacrylate product to be impeded such that it does not readily pass through layer 20 and have harmful affect on the layers 22, 24, etc., which are beyond layers 18 and 20, as viewed from the layer 18 surface through the sheet material. Thus, the compositions of the various layers 22, 24, etc., beyond layer 20 may be selected for their other desirable properties. Thus, layer 22 is defined rather broadly, as a polymer or an adhesive, and may be selected for properties desired. In a three layer structure as in FIG. 4, layer 22 may, for example, conveniently be any polymer which adheres well to the primed surface of the HDPE. Typical layer 22 polymers would be low density polyethylene (LDPE), HDPE, and propylene ethylene copolymer (PPE). Where a fourth layer is present in the sheet material, then the layer 22 must adhere well to it as well as to the interface at layers 18 and 20. In these structures, layer 22 may be considered to be a layer serving primarily an adhesive function. The adhesive layer may be a polymeric adhesive. Where the fourth layer is metal foil, an adhesive polymer such as EAA is known to adhere well to foil and is preferred for layer 22. Where the fourth layer 24 is polymeric, an adhesive polymer with graft substitutions of carboxy moieties such as maleic anhydride may be preferred. In some cases, adhesive emulsions may be used. In general, the selection of material for layer 22 depends on the definition of its function in the sheet structure, whether it be of a protective nature, as may be true in a three layer structure, or of an adhesive nature in structures having more than three layers.

The composition, then, of layers 18 and 20 are selected with the primary purpose- in addition to their normal package structural functions- of controlling migration of the cyanoacrylate product through the sheet material. When properly selected and applied, they functionally control the migration of the cyanoacrylate through the sheet material in the body of the tube such that the compositions of all the other layers may be selected without primary consideration of their susceptibility to cyanoacrylate. Thus layer 24 is represented, as in FIG. 3, as a metal foil layer which would be highly susceptible to loss of adhesion to polymers in the presence of cyanoacrylate-type products. Rather it is selected for its excellent properties as a barrier against passage of any matter through the package sheet material, into or out of the package. Other barrier materials may be used in the invention. Along with the selection of the barrier material if one is used, proper materials are selected, from those known in the art, for the layers adjacent the barrier layer to ensure adhesion to, and compatibility with, the rest of the sheet structure. Exemplary of alternate barrier materials are vinylidene chloride copolymers, ethylene vinyl alcohol copolymer, and blends including major fractions of these.

Layer 22 is preferrably EAA, another material susceptible of being greatly swelled by cyanoacrylate. But, with the protection provided by layers 18 and 20, the EAA is essentially not affected by the product in the body of the tube and is selected for its excellent adhesive properties to the metal foil. Likewise layers 26 and 28 may be selected without primary consideration of direct interaction with the product. By the same consideration, the layers 22 and 28, as well as additional layers may be selected with substantial freedom as long as the layers 18 and 20 provide a protective barrier between them and the product in the body of the tube.

While the sheet material 14 is functional for protecting itself from interaction with the product through the functioning of the HDPE layer 18 and primer layer 20, it is seen to be susceptible to interaction with the product along an edge of the sheet material, as when formed into a lap seam as in FIG. 3A. Thus, even though the sheet material itself is not vulnerable to interaction with cyanoacrylate-type products through the HDPE and primer layers, the edge of the sheet material is vulnerable to interaction at the lap seam. The inventors herein have found that the edge of the sheet material, which is otherwise vulnerable to interaction at the lap seam, may be effectively protected by applying a strip of HDPE over the seam, to cover the lap seam. While thickness of the strip is not seen as critical, a convenient thickness is 2 mils. It is important that the strip cover the entire seam overlap, and be bonded to it. Incomplete coverage results in incomplete protection. With the strip properly positioned to cover the entire seam, as seen at 316 in FIG. 3, the lap seam is successfully protected. The preferred compositions and properties of the HDPE in the covering strip 16 are the same as those disclosed above for the layer on the interior surface of the tube package 10, that being HDPE layer 18. One significant difference is that strip 16 has been found to not need a primer layer, as does the HDPE at layer 20 for the sheet material as a whole, in order to be effective in protecting the lap seam 12.

Figure 12:
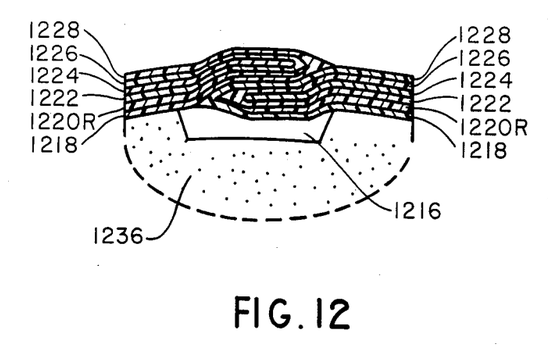
FIG. 12 is a greatly enlarged view of the portion of the tube in FIG. 11 which is outlined by the dashed circle; and includes the lap seam and product; and shows the sheet material including reacted product material.

The strip may beneficially be bonded, as by thermal methods, to the inner surface of the tube lap seam in the same processing operation which forms the tube lap sideseams. In the strip bonding operation, the strip is heated and pressed against the inner surface of the lap seam such that it covers the lap seam and conforms to its surface, as seen in FIGS. 3 and 12. With the seam thus covered, the strip of HDPE is effectively interposed between the product and the lap seam when product is introduced into the package. A preferred process for bonding the strip 16 to the interior surface of the tube at the lap seam is seen illustrated in FIGS. 13 and 14. The equipment seen in FIG. 13 generally represents conventional equipment for forming a lap seam in sheet material to make a tube therefrom, the equipment having been modified to also apply the strip 16.

Figure 13:
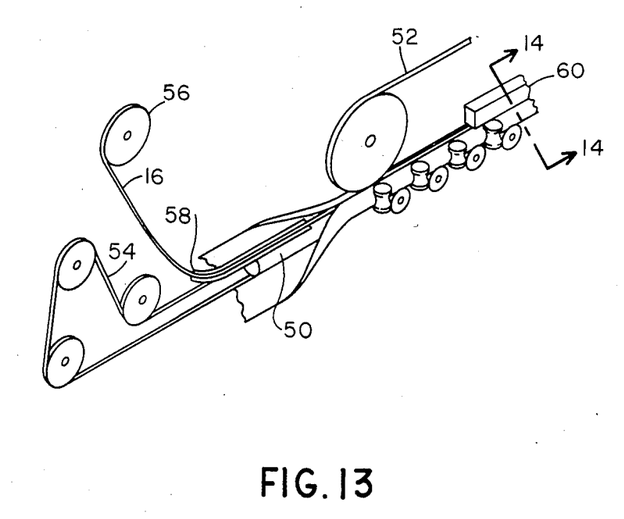
FIG. 13 shows, pictorially, processing equipment useful in forming the side seam in tubes of this invention.
Figure 14:
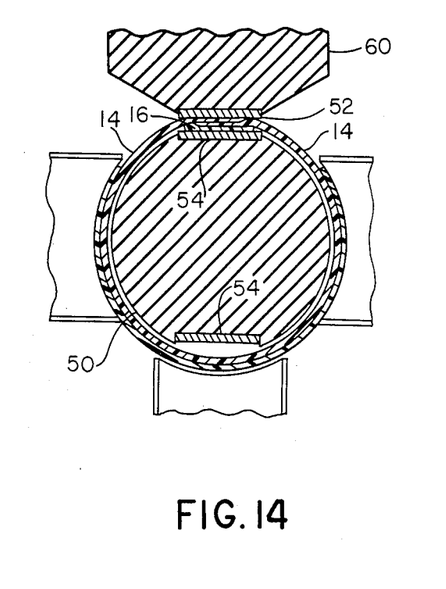
FIG. 14 is a cross-section, taken at 14—14 of FIG. 13 and showing the formation of the tube sideseam seal.

As is conventional, the sheet material 14 is formed in tubular fashion about a mandrel 50 such that the edges of the sheet material overlap at locus where they are to be formed into a sealed lap seam. As the edges of the sheet material are brought into the lap relationship, they are covered on the top by overlying belt 52 and on the bottom by underlying belt 54. In accordance with this invention, strip 16 is simultaneously fed from roll 56 through guides 58 into the seam overlap area at the locus where the two edges of the sheet material are being brought together to form the overlap. Strip 16 is guided such that it is positioned below the underlying edge of the sheet material 14 and above belt 54, as seen in FIG. 14. Thus are the edges of the sheet material 14 brought into a lapping relationship, with the strip 16 being positioned on the inner surface of the loosely assembled tube as it is being formed.

As the loose assembly progresses along in the tube forming operation, heat is applied to the overlapped edges and the strip; while belts 52 and 54 move at approximately the same speed as the sheet material and the strip. As the heated assemblage progresses along the processing equipment, the edges and the strip are pressed together between the mandrel 50 and a pressure bar 60. The combination of heat and pressure activates the adhesive properties of the sheet material and the strip to cause them to bond together in formation of the protected lap seam. Heat and pressure are then released, providing the desired tube. With the lap seam thus covered by the strip 16, the strip is effectively interposed between the product and the lap seam when product is introduced into the tube package.

The most preferred structure for the tube herein is that illustrated in FIG. 3 and 12. The sealant layer 18 and the primer layer 20 are narrow molecular weight HDPE and crosslinking PEI respectively. Strip 16 is also narrow molecular weight HDPE. "Narrow molecular weight" is a relative term, used by the industry, that identifies the subject group of HDPE polymers by subjectively comparing their molecular weight distributions with those of other HDPE polymers. Layer 22 is EAA which serves as an adhesive to the metal foil barrier layer 24. Layer 26 is perferably EAA, which serves as an adhesive between the foil layer 24 and layer 28 which is desirably a layer of a polymer which is typically selected for its abuse resistance and its heat sealability. While the preferred composition for layer 28 is HDPE, other materials may be preferred for some uses. The composition of the adhesive layer 26 is selected in view of the selected compositions of both layers 24 and 28. Additional layers may be used as dictated by the situation, such as for printing, pigmenting, etc.

In order for the combined properties of the HDPE strip, the HDPE layer 18 and the primer in layer 20 to provide protection for the other material layers in the tube structure, namely, protection from the cyanoacrylate product, it is important that the HDPE be interposed between the cyanoacrylate-type product and the other layers at all areas where the product is in contact with the packaging sheet material.

The process of making the sheet structure of the invention will now be discussed in terms of the more complex structure; and it will be seen that the simpler structures are in some cases substructures thereof. The discussion of complex structures as in FIG. 3, thus also includes the general types of processes which may be used to make the simpler 3 or 4 layer structures.

In the first operation, a layer of HDPE is formed, as by an extrusion process. The process is designed for relatively slow cooling of the extruded HDPE layer in order to encourage development of crystallinity. A preferred process is tubular blown extrusion. Another acceptable process is cast extrusion where the sheet is cast onto a relatively warm roll and where the elevated temperatures are held over a period of time, down stream of the extrusion, which is conducive to development of crystallinity. The HDPE layer is then preferably corona treated to a level of at least 38 dynes/cm. of surface energy. The treated side of the HDPE is then primed with a solution containing a polyethylene imine primer and dried, leaving a continuous layer of PEI on the surface of the HDPE. The primed side of the HDPE layer is then extrusion laminated to aluminum foil using EAA as the extrusion laminant. The structure at this stage is represented by FIG. 5. The structure as represented by FIG. 6 is completed by extrusion laminating a previously formed abuse resistant layer, such as HDPE, to the exposed side of the foil, using EAA as the extrusion laminant.

If desired, the sheet material may then be reacted with cyanoacrylate moieties, to form a sheet material having a reacted primer layer 20R, before forming it into the tubular structure as in FIGS. 1 and 7. The reaction may be carried out by contacting the HDPE layer 18 with the cyanoacrylate moieties.

In making the 3-layer structure, represented by FIG. 4, the HDPE layer is formed, treated and primed as previously indicated. Layer 22 is then added by an appropriate process. A typical process is extrusion coating of the appropriate material onto the primed surface. In another exemplary process, layer 22 is formed in a separate operation and is joined to primer layer 20 by heat and pressure lamination at a hot nip, or may be extrusion laminated to layer 20 by using an intervening layer of an extrusion laminant.

While tube packages have been described herein as they apply to holding cyanoacrylate-type products, other products may also be desirably packaged therein. In those cases, materials which are less preferred for holding cyanoacrylate may be more desirable because of other advantages such as economics or processing advantages.

Thus it is seen that the invention provides a dispensing tube package which is capable of holding a cyanoacrylate-type product. The dispensing tube has a lap sideseam. The invention further provides, in combination, a dispensing tube having a lap sideseam, having excellent barrier to passage of matter through the package material, and having the capability of holding a cyanoacrylate-type product.

Having thus described the invention, what is claimed is:

1. In combination, a tube made from a multiple layer sheet material and a covering polymeric strip, said sheet material comprising:
   (a) a first layer of high density polyethylene;
   (b) a second layer, the composition of said second layer being chosen from the group consisting of polymers and adhesives; and
   (c) a third primer layer of polyethylene imine, said third primer layer being between said first and second layers, said sheet material having been formed into a tube having a lap seam extending along the length of said tube, said first layer being disposed toward the inside of said tube, all the layers of said sheet material being firmly adhered to each other;
   said tube having an inner surface facing the interior of said tube and an outer surface on the exterior of said tube; said polymeric strip covering said lap seam on said interior surface of said tube and not extending between said lap seam, said strip comprising polyethylene having a resin density of at least 0.950.

2. A tube as in claim 1 wherein said high density polyethylene in said strip has a narrow molecular weight distribution.

3. A tube as in claim 2 wherein said first layer and said strip substantially free of amine components.

4. A tube as in claim 3 wherein said third layer is derived from a liquid solution containing polyethylene imine of the cross-linking type.

5. A tube as in claim 4 wherein the composition of said second layer is ethylene acrylic acid copolymer, wherein said sheet material further comprises a fourth layer of metal foil and wherein said second layer is between said third layer and said fourth layer.

6. A tube as in claim 2 wherein said third layer is derived from a liquid solution containing polyethylene imine of the cross-linking type.

7. A tube as in claim 6 wherein composition of said second layer is ethylene acrylic acid copolymer, wherein said sheet material further comprises a fourth layer of metal foil and wherein said second layer is between said third layer and said fourth layer.

8. A tube as in claim 1 wherein said high density polyethylenes in both said strip and said first layer have narrow molecular weight distributions.

9. A tube as in claim 8 wherein said first layer and said strip are substantially free of amine components.

10. A tube as in claim 9 wherein said third layer is derive from a liquid solution containing polyethylene imine of the cross-linking type.

11. A tube as in claim 10 wherein the composition of said second layer is ethylene acrylic acid copolymer, wherein said sheet material further comprises a fourth layer of metal foil and wherein said second layer is between said third layer and said fourth layer.

12. A tube as in claim 8 wherein said third layer is derived from a liquid solution containing polyethylene imine of the cross-linking type.

13. A tube as in claim 12 wherein the composition of said second layer is ethylene acrylic acid copolymer, wherein said sheet material further comprises a fourth layer of metal foil and wherein said second layer is between said third layer and said fourth layer.

14. A tube as in claim 1 wherein said first layer and said strip are substantially free of amine components.

15. A tube as in claim 14 wherein said third layer is derived from a liquid solution containing polyethylene imine of the cross-linking type.

16. A tube as in claim 15 wherein the composition of said second layer is ethylene acrylic acid copolymer, wherein said sheet material further comprises a fourth layer of metal foil and wherein said second layer is between said third layer and said fourth layer.

17. A tube as in claim 16 and including a fifth layer adhering a sixth layer of polyethylene to said fourth layer of metal foil.

18. A tube as in claim 1 wherein said third layer is derived from a liquid solution containing polyethylene imine of the cross-linking type.

19. A tube as in claim 18 wherein the composition of said second layer is ethylene acrylic acid copolymer, wherein said sheet material further comprises a fourth layer of metal foil and wherein said second layer is between said third layer and said fourth layer.

20. A tube as in claim 1 wherein the composition of said second layer is ethylene acrylic acid copolymer, wherein said sheet material further comprises a fourth layer of metal foil and wherein said second layer is between said third layer and said fourth layer.

21. A tube as in claim 20 and including a fifth layer adhering a sixth layer of polyethylene to said fourth layer of metal foil.

22. A tube as in claim 1, said lap seam comprising two edges of said sheet material overlapping each other to form a lap area wherein portions of said sheet material adjacent said edges are in lap relationship with each other, one said portion being an overlying portion and edge on, and adjacent, the exterior of said lap, the other said portion being an underlying portion and edge on, and adjacent, the interior of said lap, said underlying portion being between, and in contact with, said overlying portion and said strip.

23. A tube as in claim 1, said lap seam comprising two edges of said sheet material overlapping each other to form a lap area wherein portions of said sheet material adjacent said edges are in lap relationship with each other, one said portion being an overlying portion and edge on, and adjacent, the exterior of said lap, said strip being thermally bonded to said underlying portion and to said overlying portion on said inner surface of said tube.

24. A tube as in claim 1, said strip being thermally bonded to said inner surface of said tube on both sides of said lap seam.

25. In combination, a tube package made from a multiple layer sheet material and a covering polymeric strip, said package including a product therein, said product including a substantial fraction of a cyanoacrylate-type component, said sheet material comprising;
  (a) a first layer of polyethylene having a resin density of at least 0.950;
  (b) a second layer, the composition of said second layer being chosen from the group consisting of polymers and adhesives; and
  (c) a third primer layer of polyethylene imine,
  said third primer layer being between said first and second layers, said sheet material having been formed into a tube having a lap seam extending along the length of said tube and not extending between said lap seam, said first layer being disposed toward the inside of said tube, all the layers of said sheet material being firmly adhered to each other, and said tube package being closed on both ends thereof;
said tube having an inner surface facing the interior of said tube and an outer surface on the exterior of said tube; said polymeric strip covering said lap seam on said interior surface of said tube, said strip comprising high density polyethylene having a resin density of at least 0.950.

26. A tube package as in claim 25 wherein said high density polyethylene in said strip has a narrow molecular weight distribution.

27. A tube package as in claim 26 wherein said first layer and said strip are substantially free of amine components.

28. A tube package as in claim 27 wherein said third layer is derived from a liquid solution containing polyethylene imine of the cross-linking type.

29. A tube package as in claim 26 wherein said third layer is derived from a liquid solution containing polyethylene imine of the cross-linking type.

30. A tube package as in claim 29 wherein the composition of said second layer is ethylene acrylic acid copolymer, wherein said sheet material further comprises a fourth layer of metal foil and wherein said second layer is between said third layer and said fourth layer.

31. A tube package as in claim 30 and including a fifth layer of ethylene acrylic acid copolymer adhering a sixth layer of polyethylene to said fourth layer of metal foil.

32. A tube package as in claim 25 wherein said high density polyethylene in both said strip and said first layer have narrow molecular weight distributions.

33. A tube package as in claim 32 wherein said first layer and said strip are substantially free of amine components.

34. A tube package as in claim 33 wherein said third layer is derived from a liquid solution containing a polyethylene imine of the cross-linking type.

35. A tube package as in claim 34 wherein the composition of said second layer is ethylene acrylic acid copolyer, wherein said sheet material further comprises a fourth layer of metal foil and wherein said second layer is between said third layer and said fourth layer.

36. A tube package as in claim 33 wherein the composition of said second layer is ethylene acrylic acid copolymer, wherein said sheet material further comprises a fourth layer of metal foil and wherein said second layer is between said third layer and said fourth layer.

37. A tube package as in claim 36 and including a fifth layer of ethylene acrylic acid copolymer adhering a sixth layer of polyethylene to said fourth layer of metal foil.

38. A tube package as in claim 32 wherein said third layer is derived from a liquid solution containing polyethylene imine of the cross-linking type.

39. A tube package as in claim 38 wherein the composition of said second layer is ethylene acrylic acid copolymer, wherein said sheet material further comprises a fourth layer of metal foil and wherein said second layer is between said third layer and said fourth layer.

40. A tube package as in claim 39 and including a fifth layer of ethylene acrylic acid copolymer adhering a sixth layer of polyethylene to said fourth layer of metal foil.

41. A tube package as in claim 25 wherein said first layer and said strip are substantially free of amine components.

42. A tube package as in claim 41 wherein said third layer is derived from a liquid solution containing polyethylene imine of the cross-linking type.

43. A tube package as in claim 41 the composition of said second layer is ethylene acrylic acid copolymer, wherein said sheet material further comprises a fourth layer of metal foil and wherein said second layer is between said third layer and said fourth layer.

44. A tube package as in claim 43 and including a fifth layer of ethylene acrylic acid copolymer adhering a sixth layer of polyethylene to said fourth layer of metal foil.

45. A tube package as in claim 25 wherein said third layer is derived from a liquid solution containing a polyethylene imine of the cross-linking type.

46. A tube package as in claim 45 wherein the composition of said second layer is ethylene acrylic acid copolymer, wherein said sheet material further comprises a fourth layer of metal foil and wherein said second layer is between said third layer and said fourth layer.

47. A tube package as in claim 46 and including a fifth layer of ethylene acrylic acid copolymer adhering a sixth layer of polyethylene to said fourth layer of metal foil.

48. A tube package as in claim 25 wherein the composition of said second layer is ethylene acrylic acid copolymer, wherein said sheet material further comprises a fourth layer of metal foil and wherein said second layer is between said third layer and said fourth layer.

49. A tube package as in claim 48 and including a fifth layer of ethylene acrylic acid copolymer adhering a sixth layer of polyethylene to said fourth layer of metal foil.

50. A tube package as in claim 25, said lap seam comprising two edges of said sheet material overlapping each other to form a lap area wherein portions of said sheet material adjacent said edges are in lap relationship with each other, one said portion being on overlying portion and edge on, and adjacent, the exterior of said lap, the other said portion being an underlying portion and edges on, and adjacent, the exterior of said lap, said underlying portion being between, and in contact with, said overlying portion of said strip.

51. A tube as in claim 25, said strip being thermally bonded to said inner surface of said tube on both sides of said lap seam.

52. In combination, a tube made from a multiple layer sheet material and a covering polymeric strip, said sheet material comprising:
  (a) a first layer of high density polyethylene;
  (b) a second layer, the composition of said second layer being chosen from the group consisting of polymers and adhesives; and (c) a third primer layer, the composition of said primer layer comprising a major fraction of a Lewis base, said third primer layer being between said first and second layers, said sheet material having been formed into a tube having a lap seam extending along the length of the said tube, said first layer being disposed toward the inside of said tube and not extending between said lap seam, all the layers of said sheet material being firmly adhered to each other;

said tube having an inner surface facing the interior of said tube and an outer surface on the exterior of said tube; said polymeric strip covering said lap seam on said interior surface of said tube, said strip comprising polyethylene having a resin density of at least 0.950.

53. In combination, a tube package made from a multiple layer sheet material and a covering polymeric strip, said package including a product therein, said product including a substantial fraction of cyanoacrylate-type component, said sheet material comprising:

(a) a first layer of polyethylene having a resin density of at least 0.950;

(b) a second layer, the composition of said second layer being chosen from the group consisting of polymers and adhesives; and (c) a third primer layer, the composition of said primer layer comprising a major fraction of a Lewis base, said third primer layer being between said first and second layers, said sheet material having been formed into a tube having a lap seam extending along the length of said tube, said first layer being disposed toward the inside of said tube, all the layers of said sheet material being firmly adhered to each other;

said tube having an inner surface facing the interior of said tube and an outer surface on the exterior of said tube, said polymeric strip covering said lap seam on said interior surface of said tube and not extending between said lap seam, said strip comprising polyethylene having a resin density of at least 0.950.

54. A tube package as in claim 53 and wherein the polyethylene in said strip has a narrow molecular weight distribution and wherein the composition of said strip is substantially free of amine components.

55. In combination, a tube package made from a multiple layer sheet material and a covering polymeric strip, said package including a product therein, said product including a substantial fraction of a cyanoacrylate-type component, said sheet material comprising:

(a) a first layer of polyethylene having a resin density of at least 0.950;

(b) a second layer, the composition of said second layer being chosen from the group consisting of polymers, and adhesives; and (c) a third primer layer, said third layer including polyethylene imine and reacted components from said cyanoacrylate-type product, said third primer layer being between said first and second layers, said sheet material, or a precursor thereof, having been formed into a tube having a lap seam extending along the length of said tube, said first layer being disposed toward the inside of said tube, all the layers of said sheet material being firmly adhered to each other;

said tube having an inner surface facing the interior of said tube and an outer surface on the exterior of said tube; said polymeric strip covering said lap seam on said interior surface of said tube and not extending between said lap seam, said strip comprising polyethylene having a resin density of at least 0.950.

56. A tube package as in claim 55 and wherein said first polyethylene layer has a narrow molecular weight distribution, and is substantially free of amine components.

57. A tube package as in claim 56, said second layer comprising ethylene acrylic acid copolymer.

58. A tube package as in claim 57 and including a fourth layer of metal foil, said second layer being between said third layer and said fourth layer; and a fifth layer adhering a sixth layer to said fourth layer of metal foil.

59. A tube package as in claim 58 wherein said fifth layer is ethylene acrylic acid copolymer and said sixth layer is polyethylene.

60. A tube package as in claim 59 and wherein the polyethylene in said strip has a narrow molecular weight distribution and wherein the composition of said strip is substantially free of amine components.

* * * * *